US012484819B2

(12) United States Patent
Samproni (10) Patent No.: US 12,484,819 B2
(45) Date of Patent: Dec. 2, 2025

(54) SYRINGE APPARATUS AND METHODS (71) Applicant: Siemens Healthcare Diagnostics Inc., Tarrytown, NY (US)

(72) Inventor: Jennifer Samproni, Braintree, MA (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 829 days.

(21) Appl. No.: 17/435,449

(22) PCT Filed: Feb. 25, 2020

(86) PCT No.: PCT/US2020/019644
§ 371 (c)(1),
(2) Date: Sep. 1, 2021

(87) PCT Pub. No.: WO2020/185393
PCT Pub. Date: Sep. 17, 2020

(65) Prior Publication Data
US 2022/0054063 A1    Feb. 24, 2022

Related U.S. Application Data

(60) Provisional application No. 62/816,486, filed on Mar. 11, 2019.

(51) Int. Cl.
*A61B 5/15*        (2006.01)
*A61B 5/153*       (2006.01)

(52) U.S. Cl.
CPC .. *A61B 5/150755* (2013.01); *A61B 5/150206* (2013.01); *A61B 5/153* (2013.01)

(58) Field of Classification Search
CPC ........ A61B 5/150755; A61B 5/150206; A61B 5/153; A61B 5/150236; A61B 5/150519;
(Continued)

(56) References Cited

U.S. PATENT DOCUMENTS

| 4,687,000 A | 8/1987 | Eisenhardt et al. |
| 5,240,322 A | 8/1993 | Haber et al. |

(Continued)

FOREIGN PATENT DOCUMENTS

| DE | 2850548 A1 | 6/1980 |
| EP | 0066702 A2 | 12/1982 |

(Continued)

OTHER PUBLICATIONS

International Search Report and Written Opinion of International Application No. PCT/US2020/019644 dated May 22, 2020.

*Primary Examiner* — Jennifer Robertson
*Assistant Examiner* — Nidhi N Patel (57) ABSTRACT

Disclosed is a syringe apparatus. Syringe apparatus has a barrel including an inner surface, an open end, and an inlet end; a plunger including a plunger head received in slidable sealing contact with the inner surface of the barrel and forming a reservoir therein; and an extensible member, optionally including an additive, is contained in the reservoir. Extensible member can be coupled between the inlet end and the plunger head and is extensible in length L as a bio-liquid (e.g., whole blood) is drawn into the reservoir. Methods of mixing or adding an additive such as an anticoagulant, coagulant, or marker, to a bio-liquid are provided, as are other aspects.

23 Claims, 5 Drawing Sheets

(58) Field of Classification Search
CPC ........ A61B 5/150389; A61B 5/150503; A61B 5/150099; A61B 5/15003
See application file for complete search history.

(56) References Cited

U.S. PATENT DOCUMENTS

| | | | |
|---|---|---|---|
| 6,126,643 | A | 10/2000 | Vaillancouert |
| 6,234,795 | B1 | 5/2001 | Fischer |
| 6,428,527 | B1 | 8/2002 | Jones et al. |
| 6,511,439 | B1 | 1/2003 | Tabata et al. |
| 7,867,547 | B2 | 1/2011 | Tochterman et al. |
| 2003/0195463 | A1 | 10/2003 | Trombley, III et al. |
| 2013/0209985 | A1 | 8/2013 | Hoke et al. |
| 2015/0126905 | A1* | 5/2015 | Lowry ............. A61B 5/150519 600/576 |
| 2017/0042460 | A1* | 2/2017 | Holmes ............ A61B 5/150389 |

FOREIGN PATENT DOCUMENTS

| | | |
|---|---|---|
| EP | 0857460 A2 | 8/1998 |
| WO | 8500662 A1 | 2/1985 |

\* cited by examiner

SYRINGE APPARATUS AND METHODS

CROSS REFERENCE TO RELATED APPLICATIONS

This disclosure is a 371 of PCT/US2020/019644, filed Feb. 25, 2020, which claims priority to U.S. Provisional Patent Application No. 62/816,486, filed Mar. 11, 2019, the disclosure disclosures of which is are incorporated herein by reference in their entireties for all purposes.

FIELD

The present invention relates to syringes and methods of drawing bio-liquids from a patient or source, such as whole blood.

BACKGROUND

In phlebotomy, such as when drawing a whole blood specimen from a patient using a syringe, in some cases, such as coagulation studies, blood gas testing, testing for drugs or heavy metals, testing blood chemistry such as glucose testing, DNA testing, and the like, an anticoagulant is provided inside the syringe. In one type of conventional syringe, the anticoagulant can be coated on a wall of a reservoir that ultimately receives the whole- blood specimen. In another type of conventional syringe, a small fibrous sheet and mixing ball can be included in the reservoir. Once the whole blood specimen is drawn, the phlebotomist mixes the anticoagulant and the specimen, such as by using defined motions of the syringe in the case of the anticoagulant-coated syringe or with the use of the mixing ball in the case where the small fibrous sheet is contained in the reservoir.

SUMMARY

Some embodiments of the present disclosure provides a syringe apparatus including an internal extensible member. In some embodiments, the extensible member can include an additive disposed thereon and/or therein. The additive can be a material that is configured to change or retain a certain consistency or property of the drawn bio-liquid specimen. Such an additive can include, but is not limited to, an anticoagulant, a coagulant, or a marker (e.g., a fluorescent marker). The anticoagulant or even a coagulant can be configured to change or retain a certain consistency of the drawn bio-liquid specimen, such as a lack of clotting or a degree of clotting. The marker can be used to bind to a component in the bio-liquid to aid diagnostics. The additive can chemically change the bio-liquid or a component thereof, such as intentional chemical lysis.

Some embodiments of the present disclosure provide a syringe apparatus configured to draw and contain in an internal reservoir thereof, a bio-liquid specimen obtained from a patient or other source, wherein the reservoir contains an additive provided in and/or on an extensible additive-disassociating member wherein the extensible additive-disassociating member is extensible along its length within the reservoir.

In another aspect, some embodiments of the present disclosure provide a syringe apparatus comprising a barrel including an inner surface, an open end, and an inlet end; a plunger including a plunger head received in slidable sealing contact with the inner surface of the barrel and forming a reservoir therein; and an extensible additive-disassociating member contained in the reservoir.

In yet another apparatus aspect, some embodiments of the present disclosure provide a syringe apparatus comprising a barrel including a cylindrical inner surface, an open end, and an inlet end; a plunger including a plunger shaft and a plunger head, the plunger head received in slidable sealing contact with the cylindrical inner surface and forming a reservoir therein between the plunger head and the inlet end; and an extensible additive-disassociating member contained in the reservoir and coupled to the plunger head and the inlet end, the additive-disassociating member comprising a central opening formed therein, the extensible additive-disassociating member comprising at least one of an anticoagulant, a coagulant, or a marker.

According to another aspect of the present disclosure, a syringe apparatus is provided. The syringe apparatus comprises a barrel including an inner surface, an open end, and an inlet end; a plunger including a plunger head received in slidable sealing contact with the inner surface of the barrel and forming a reservoir therein; and an extensible member contained in the reservoir, wherein the extensible member is configured to be extensible upon drawing a bio-liquid into the reservoir.

According to another aspect of the present disclosure, a method of adding an additive to a bio-liquid specimen is provided. The method comprises providing a syringe apparatus comprising a barrel including an open end, and an inlet end, a plunger head slidable in the barrel, a reservoir, and an extensible additive-disassociating member contained in the reservoir; moving the plunger head and drawing the bio-liquid into the reservoir while extending the extensible additive-disassociating member within the reservoir; and disassociating an additive from the extensible additive-disassociating member into the bio-liquid in the reservoir.

According to yet another method aspect of the present disclosure, a method of mixing a bio-liquid is provided. The method comprises providing a syringe apparatus comprising a barrel including an open end, an inlet end, a plunger head slidable in the barrel, a reservoir, and an extensible member within the reservoir, optionally including an additive contained in the reservoir, and moving the plunger head and drawing the bio-liquid into the reservoir while extending the extensible member within the reservoir, wherein mixing of the bio-liquid is enhanced by the presence of the extensible member.

Still other aspects, features, and advantages of the present disclosure may be readily apparent from the following detailed description by illustrating a number of example embodiments and implementations. The present disclosure may also be capable of other and different embodiments, and its several details may be modified in various respects, all without departing from the scope of the present invention. Further features and aspects of embodiments will become more fully apparent from the following detailed description, the claims, and the accompanying drawings. Accordingly, the drawings and description are to be regarded as illustrative in nature, and not as restrictive. Any feature of the various embodiments described herein can be used in any of the other embodiments described herein, as applicable. The invention is to cover all modifications, equivalents, and alternatives falling within the scope of the claims.

BRIEF DESCRIPTION OF THE DRAWINGS

The accompanying drawings, described below, are for illustrative purposes and are not necessarily drawn to scale. The drawings are not intended to limit the scope of the disclosure in any way. Like numerals are used throughout the specification and drawings to denote like elements.

FIG. 1A illustrates a partially cross-sectioned view of a syringe apparatus shown in a "closed" orientation according to one or more embodiments of the disclosure.

DETAILED DESCRIPTION

In some bio-liquid drawing procedures, such as when drawing whole blood for conducting tests as described above, it may be desirable to add an additive to the bio-liquid, such as an anticoagulant, to retain an non-clotted property (i.e., to prevent coagulation or clotting). Such an additive may be a heparin-containing component or other anti-clotting agent, such as lithium heparin, and the like. According to embodiments of the disclosure, other suitable additives, such as a coagulant, a marker (fluorescent marker), or the like may be added in some instances. The additive is configured to be disassociated from the extensible additive-disassociating member by being dissolved and/or mixed with the drawn in bio-liquid. In other embodiments, the extensible member can be devoid of an additive, and simply may contribute to mixing or remixing the drawn in bio-liquid.

In one or more embodiments of the disclosure, an extensible member (e.g., an extensible additive-disassociating member) is provided which is extensible, i.e., capable of being extended in length as the plunger of the syringe draws in bio-liquid. Moreover, when testing for blood gas or other components in the bio-liquid, it may be desirable to access the reservoir of the syringe apparatus with a probe. The probe may aspirate a predetermined amount of the bio-liquid from the reservoir for transfer to an analyzer (e.g., blood gas or other chemical or property analyzer), such as to a test cell, test chamber, or test sensor thereof. Thus, in accordance with one or more embodiments disclosed herein, the extensible member (e.g., extensible additive-disassociating member) may include a central opening therein that will accommodate the insertion of the probe into the reservoir and thus enable the extraction of some portion of the drawn in bio-liquid.

In another aspect, the extensible additive-disassociating member may include one or more features that aid in mixing, such as by aiding to mix an additive with the drawn in bio-liquid. For example, the extensible member (e.g., extensible additive-disassociating member) can include webs, walls, openings, appendages, or other structures that can obstruct, deflect, move, or otherwise cause enhanced mixing of the bio-liquid within the reservoir. The enhanced mixing can be as the bio-liquid is drawn in, or as the syringe including the bio-liquid is manipulated for remixing.

These and other aspects and features of the present disclosure will be described with reference to FIGS. 1A-5 herein.

Figure 1A:
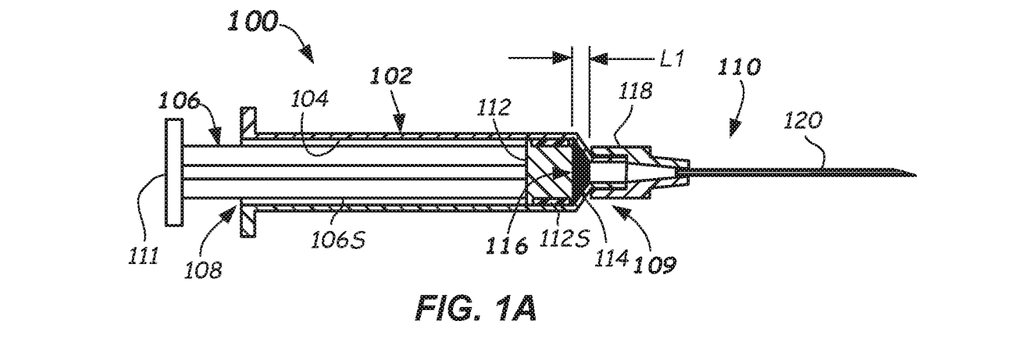
Figure 1B:
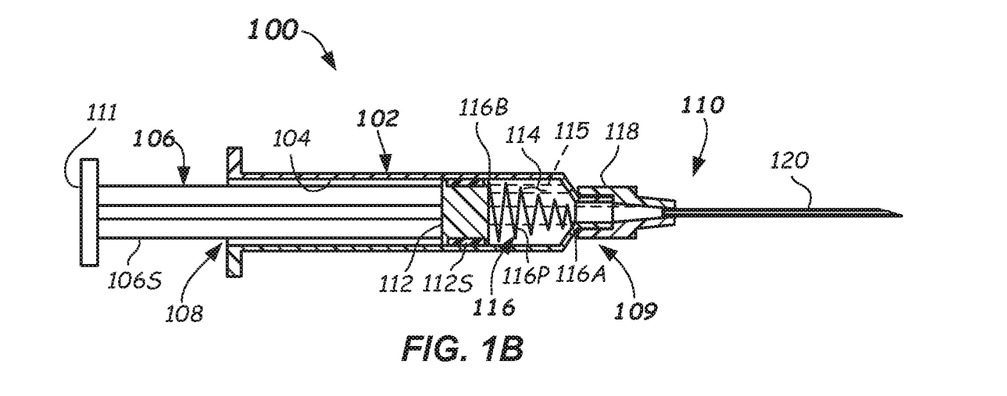
FIG. 1B illustrates a partially cross-sectioned view of the syringe apparatus of FIG. 1A shown in an "intermediate extended" orientation according to one or more embodiments of the disclosure.
Figure 1C:
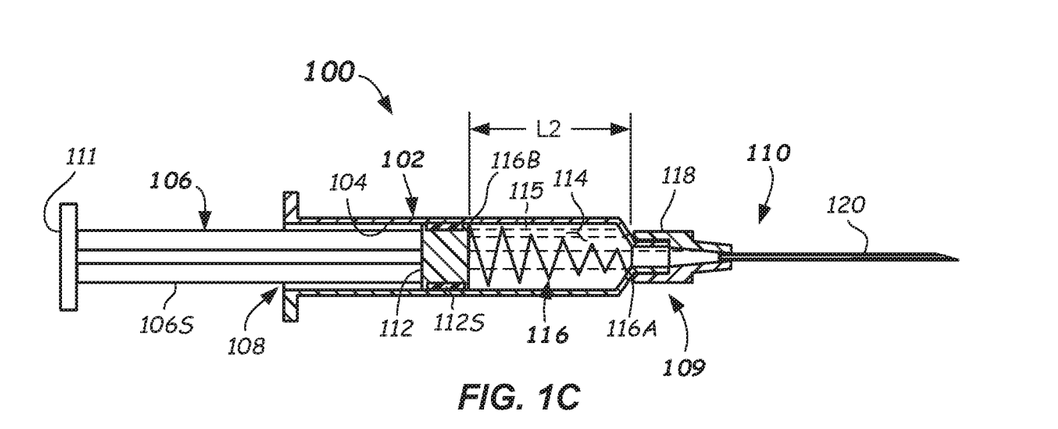
FIG. 1C illustrates a partially cross-sectioned view of the syringe apparatus of FIG. 1A shown in an "extended" orientation according to one or more embodiments of the disclosure.

In accordance with a first embodiment of the disclosure, as best shown in FIGS. 1A-1C, a syringe apparatus 100 is shown in various stages of the process of drawing a bio-liquid. The syringe apparatus 100 comprises a barrel, a plunger, and an extensible additive-disassociating member. In more detail, the barrel 102 includes an inner surface 104 (e.g., a cylindrical inner surface), an open end 108, and an inlet end 109. The inlet end 109 can include a hub and needle assembly 110 coupled thereto. Hub and needle assembly 110 can include a hub 118 configured to fasten to the barrel 102 and a needle 120 of any suitable type or gauge (e.g., from 16 gauge to 27 gauge). The hub 118 may be made as a molded plastic member and may include threads thereon. For example, the hub 118 can be a Luer Lok tip, optionally a Slip tip, or other push-on connection. The hub 118 can be threaded onto matching threads formed on the inlet end 109 of the barrel 102 and can form a sealed connection to the inlet end 109. In some embodiments, the needle 120 may be part of a winged butterfly that coupled to the inlet end 109 via a flexible tube. The needle may include a lumen and possibly a bevel. Optionally needle 120 may be blunt for withdrawing bio-liquid from another source (e.g., a container). Needle and hub may be integrally formed in some embodiments, but can include any suitable configuration for interfacing with a patient or source.

The plunger 106 can include a thumb rest 111 and a plunger head 112 (e.g., a piston-like member) received in slidable sealing contact with the inner surface 104 of the barrel 102 and thus can form a reservoir 114 therein that is configured to receive the bio-liquid 115. Any suitable seal 112S may be included on the plunger head 112 to enable a suitable seal to be made with the inner surface 104 of the barrel 102, such as an annular elastomeric seal 112S shown. The annular seal 112S may optionally include one or more lips or other suitable sealing appendages, and may be made from a polyisoprene (rubber) material, for example. Plunger head 112 of plunger 106 is inserted through open end 108. Other types, materials, and configurations of the plunger 106 can be used.

The reservoir 114 can be manufactured to contain various volumes, such as from 5 mL to 70 mL, or even from 10 ml and 35 ml, for example. Other suitable volumes can be used. The barrel 102 and the plunger 106 may be made from a transparent or translucent material, such as plastic (e.g., polypropylene, and the like). In some embodiments, the barrel 102 can be glass. Other suitable materials can be used.

The syringe apparatus 100 can further include an extensible additive-disassociating member 116 contained in the reservoir 114. The extensible additive-disassociating member 116 is shown in different states of extension in FIGS. 1A-1C, with FIG. 1A being shown in a "closed" orientation which is an orientation the syringe apparatus 100 is in prior to a draw procedure. FIG. 1B illustrates the syringe apparatus 100 shown in an "intermediate" orientation, which is an orientation the syringe apparatus 100 is in during a draw procedure wherein some bio-liquid 115 has been drawn into the reservoir 114 from the patient or source. FIG. 1C illustrates the syringe apparatus 100 shown in an "extended" orientation, which is the orientation the syringe apparatus 100 is in at an end of the draw procedure wherein a desired amount of bio-liquid 115 has been drawn into the reservoir 114 by the phlebotomist, or other person, or automated device.

The extensible additive-disassociating member 116 includes a first end 116A and a second end 116B. The first end 116A can be coupled to the inlet end 109 and the second end 116B can be coupled to the plunger head 112. Thus, in the depicted embodiment, the extensible additive-disassociating member 116 is shown as being coupled between the inlet end 110 and the plunger head 112. The first end 116A of the extensible additive-disassociating member 116 can be attached to the inlet end 110 by any suitable means, such as by an adhesive or mechanical fastening. The second end of the extensible additive-disassociating member 116 can be attached to the plunger head 112 by any suitable means, such as by an adhesive, mechanical fastening, or by being integrally molded as an extension from the plunger head (See FIG. 4C).

The extensible additive-disassociating member 116 can be manufactured from any extensible material such as plastic material (e.g., a flexible plastic sheet), a fibrous material such as a fibrous cloth or mat, paper, a porous membrane, porous film, or other the like member that is extensible, i.e., that is extendible in length L within the reservoir 114 as the plunger 106 is moved. For example, in the "closed" orientation, the length of the extensible additive-disassociating member 116 is L1 as shown in FIG. 1A. After drawing in a desired volume of the bio-liquid 115 into the reservoir 114, the length of the extensible additive-disassociating member 116 is L2 as shown in FIG. 1C, wherein L2>L1.

The additive 225 (see FIGS. 2D and 2E) that can be provided on, and/or in, the extensible additive-disassociating member 116 is configured to mix with the bio-liquid 115 in the reservoir 114 so as to retain or change a state or property of a bio-liquid 115 drawn into the reservoir 114. For example, the additive 225 can be an anticoagulant, a clot activator (e.g., a coagulant), or a marker such as a fluorescent, or other marker.

If the additive is an anticoagulant, the additive can be a heparin-containing compound, with lithium heparin being suitable for many test types, especially for blood gas testing. Optionally, the additive 225 can be a heparin-containing compound such as sodium heparin, ammonium heparin, or the like. Other additives can include citrate-phosphate-dextrose (CPD), citrate phosphate adenine (CPDA-1), a glycolytic inhibitor, sodium fluoride, potassium oxide, lithium oxalate ($Li_2C_2O_4$), sodium polyanetholesulfonate, disodium salt dihydrate (Na2EDTA), dipotassium ethylenediaminetetraacetic acid (K2EDTA), tripotassium ethylenediaminetetraacetic acid (K3EDTA), potassium ethylenediaminetetraacetic acid(KEDTA), sodium fluoride and potassium oxalate, and sodium fluoride and sodium oxalate, or the like, and combinations thereof.

The additive 225 may be applied by any suitable process in any desired amount to accomplish the desired result for the expected volume of bio-fluid 115. For example, the additive 225 may be provided on and/or in the body 216P, 216P' in an amount of between 35 USP and 150 USP units when the additive 225 is a lithium-containing anticoagulant. Other suitable loadings may be used for other anticoagulants.

In the case where the additive is a clotting agent, such as a clot activator, the additive can be a thrombin-based activator, a silica-based activator, and the like. Other suitable clotting agents can be applied. The clotting agent may be applied by any suitable process in any desired amount to accomplish the desired result for the expected volume of bio-fluid 115.

In the case where the additive is a marker, the additive can be a fluorogen or other reagent that can bind to an antigen or antibody, and the like. Florogen activating proteins and the like can be used. The marker can be disassociated and used in fluorescent imaging, such as in assays for example. The marker may be applied by any suitable process in any desired amount to accomplish the desired result for the expected volume of bio-fluid 115.

Other suitable additives can be disposed in and/or on the body 216P, 216P' and operate to change or retain any liquid property or chemical property of the bio-liquid 115.

The additive 225 can be applied to the body 116P of the extensible additive-disassociating member 116 by any suitable method, such as spraying, dipping, or painting on, or otherwise applying to the body 116P of the extensible additive-disassociating member 116. Thus, in some embodiments, the extensible additive-disassociating member 116 comprises the additive 225 coated on a surface of the body 116P, such as on surface 216S of body 216P as shown in FIG. 2D. In other embodiments, the extensible additive-disassociating member 116 comprises the additive 225 absorbed into an absorbent matrix of the body 116P, such as absorbent matrix 216M of body 216P' of extensible additive-disassociating member 216' as shown in FIG. 2E, as will be more fully explained with reference to FIGS. 2D and 2E herein.

Figures 2A, 2B, 2C:
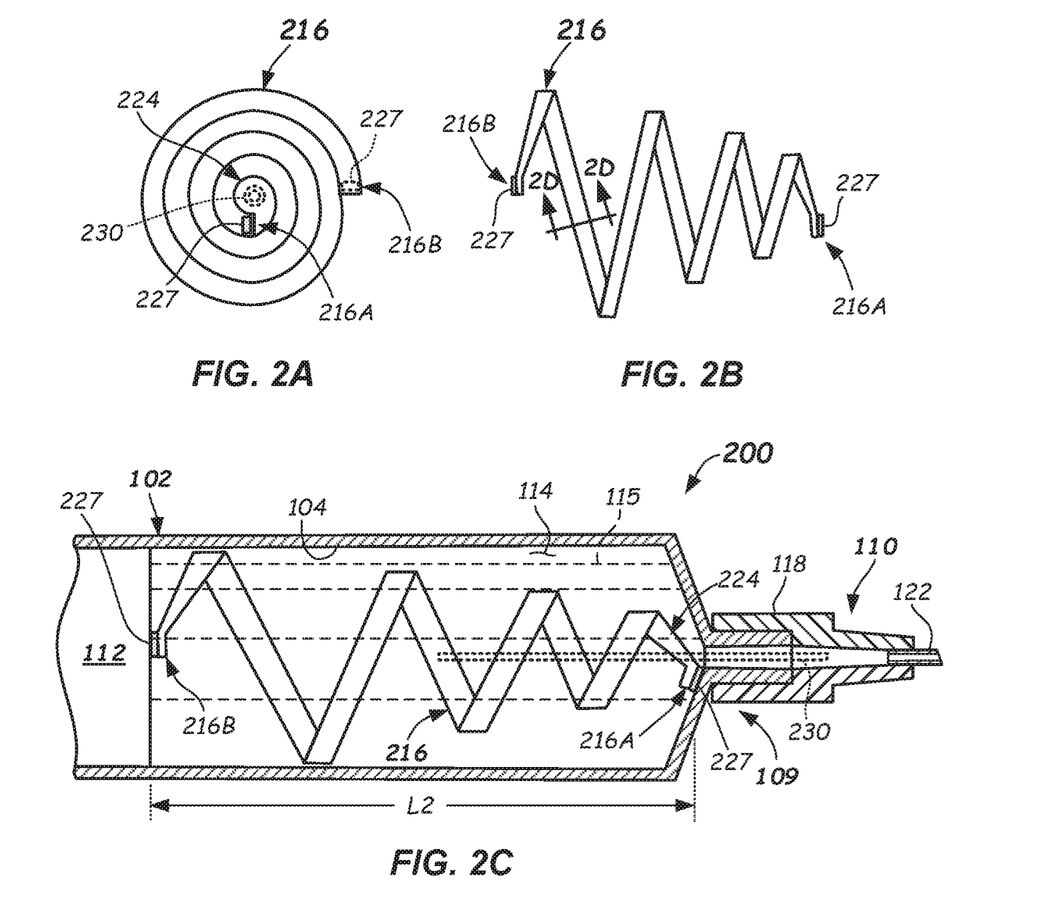
FIG. 2A illustrates an end plan view of an embodiment of extensible additive-disassociating member illustrating a spiral embodiment (shown in a non-extended, "closed" orientation) according to one or more embodiments of the disclosure.
FIG. 2B illustrates a side plan view of the embodiment of extensible additive-disassociating member of FIG. 2A shown in an "extended" orientation according to one or more embodiments of the disclosure.
FIG. 2C illustrates a partial cross-sectional side view of a syringe apparatus including the embodiment of extensible additive-disassociating member of FIG. 2B shown in an "extended" orientation according to one or more embodiments of the disclosure.
Figure 2D:
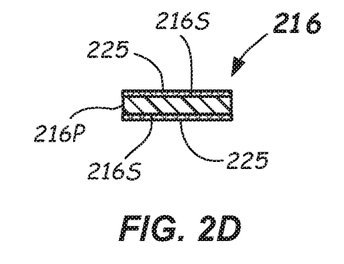
FIG. 2D illustrates a cross-sectional side view of the embodiment of extensible additive-disassociating member of FIG. 2B shown with the additive applied to a surface of an extensible body of the member according to one or more embodiments of the disclosure.
Figure 2E:
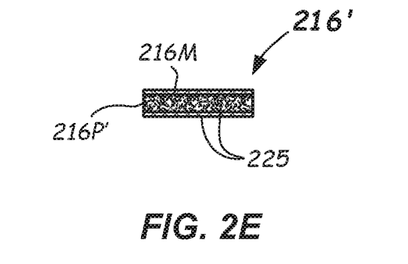
FIG. 2E illustrates a cross-sectional side view of an alternative embodiment of an extensible additive-disassociating member (at a same cross-section as shown in FIG. 2B) but shown with the additive applied to a surface and also internally to an extensible fibrous body of the member according to one or more embodiments of the disclosure.

As shown in FIGS. 2A-2C, the extensible additive- disassociating member 216 can comprise a first end 216A and a second end 216B and one or both ends can have an adhesive 227 applied to a localized area thereof. Any suitable adhesive 227 may be used. The adhesive 227 may be an epoxy adhesive, such as a UV-cured epoxy, a silicone or acrylic pressure-sensitive adhesive, or other suitable adhesive. Thus, the first end 216A can be adhered (bonded) to an end surface of the barrel 102 at the first end 109. The second end 216B can be adhered (bonded) to an end surface or face of the plunger head 112. For example, the extensible additive-disassociating member 216 with adhesive 227 applied thereto may be received into the open end 108 of the barrel 102 and then the plunger head 112 can be inserted into the open end 108 and pushed longitudinally until the adhesive 227 on the second end 216B is contacted. The plunger 106 may be pushed in further until the "closed" orientation of FIG. 1A is achieved such that the adhesive 227 on the first end 216A is fully in contact with the first end 109 of the barrel 102. Then the adhesive 227 can be cured (if cured by UV exposure) or simply placed under pressure to secure and attach the extensible additive- disassociating member 216 to the first end 109 and also to the plunger head 112. Thus, the adhesive provided the attachment of the extensible additive-disassociating member 216 first end 109 of the barrel 102 and to the plunger head 112.

In the depicted embodiment of FIGS. 2A-2C, the extensible additive-disassociating member 216 comprises a spiral, wherein the first end 216A is attached to the inlet end 109 and a second end 216B is attached to the plunger head 112. As shown, the spiral can follow a helical path from a small dimension to successively-wrapped larger dimensions. When the plunger head 112 is retracted from the "closed" orientation (e.g., like shown in FIG. 1A), the additive-disassociating member 216 takes on an "extended" spiral profile as shown in FIG. 2B and 2C, wherein individual ones of the helixes are spaced along the extended length L2 of the reservoir 114.

Furthermore, as is shown in FIGS. 2A and 2C, the additive-disassociating member 216 can include central opening 224 formed therein. The central opening 224 allows, for example, after removal of the hub and needle assembly 110 (which includes hub 118 and a needle 122), the center of the reservoir 114 to be accessed by a probe 230 (shown dotted-only a portion shown) of a test apparatus (not shown) or sequence to enable extraction and analysis of a portion of the bio-liquid 115 from the reservoir 114.

Figure 3A:
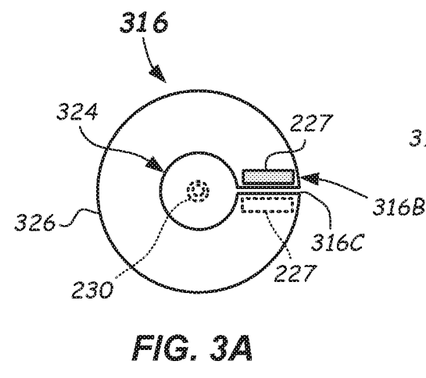
FIG. 3A illustrates an end plan view of another embodiment of extensible additive-disassociating member comprising extensible interconnected discs (shown in a non-extended, "closed" orientation) according to one or more embodiments of the disclosure.
Figure 3B:
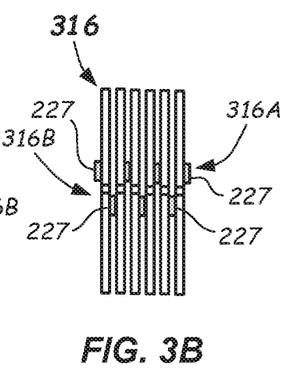
FIG. 3B illustrates a side plan view of the embodiment of extensible additive-disassociating member of FIG. 3A shown in a non-extended, "closed" orientation according to one or more embodiments of the disclosure.
Figure 3C:
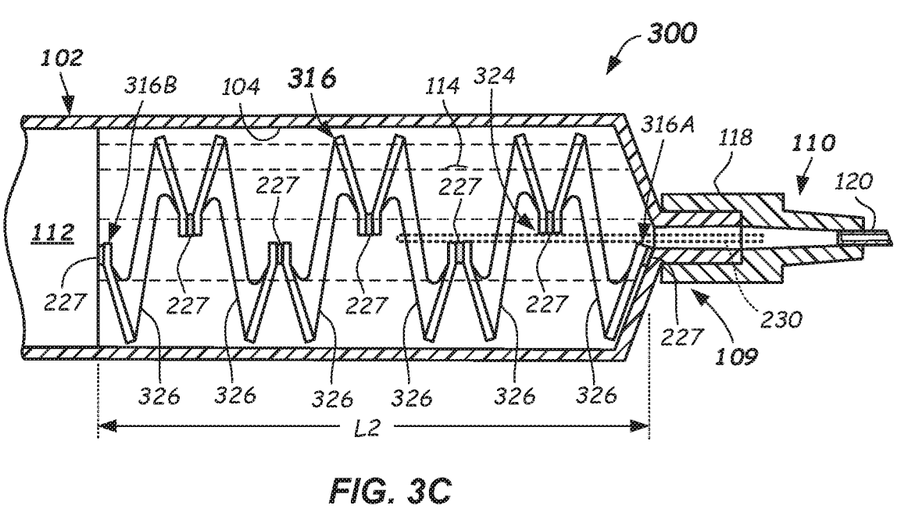
FIG. 3C illustrates a partial cross-sectional side view of a syringe apparatus including the embodiment of extensible additive-disassociating member of FIGS. 3A and 3B shown in an "extended" orientation according to one or more embodiments of the disclosure.

In the depicted embodiment of FIGS. 3A-3C, the extensible additive-disassociating member 316 can be comprised of a plurality of discs 326 that are stacked and adhered together with an adhesive 227, wherein the first end 316A is attached to the inlet end 109 and a second end 316B is attached to the plunger head 112. As shown, each disc 326 can include a cut 316C and then can be alternately adhered to an adjacent part of a directly adjacent disc 326. When the plunger head 112 is retracted from the "closed" orientation (e.g., as in FIG. 1A), the additive-disassociating member 316 takes on an extended profile as shown in FIG. 3C, wherein individual cut ends of the discs 326 are stretched out longitudinally so that the cut ends of each disc 326 move away from one another and the discs 326 can be substantially evenly spaced along the extended length L2 of the reservoir 114. Moreover, the extensible additive-disassociating member 316 comprises a plurality of interconnected planar disc elements 326 in the "closed" orientation.

Furthermore, as is shown in FIGS. 3A and 3C, the additive-disassociating member 316 can include a central opening 324 therein. The central opening 324 allows, after removal of the hub and needle assembly 110, the center of the reservoir 114 to be accessed by a probe 230 (shown dotted—only a portion shown) of a test apparatus (not shown) or sequence to enable extraction of a portion of the bio-liquid 115 from the reservoir 114 and analysis thereof.

Figure 4A:
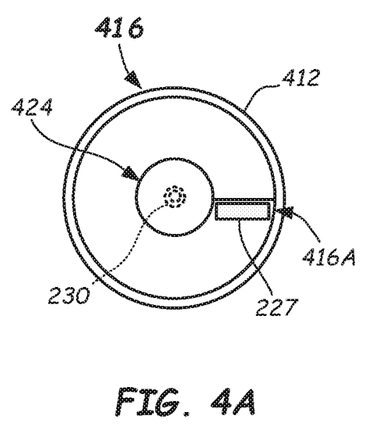
FIG. 4A illustrates an end plan view of another embodiment of extensible additive-disassociating member including a molded spiral (shown in a non-extended, "closed" orientation) according to one or more embodiments of the disclosure.
Figure 4B:
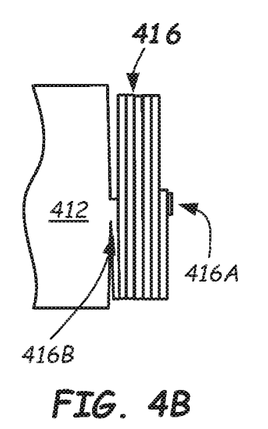
FIG. 4B illustrates a side plan view of the embodiment of the extensible additive-disassociating member of FIG. 4A shown in a non-extended, "closed" orientation according to one or more embodiments of the disclosure.
Figure 4C:
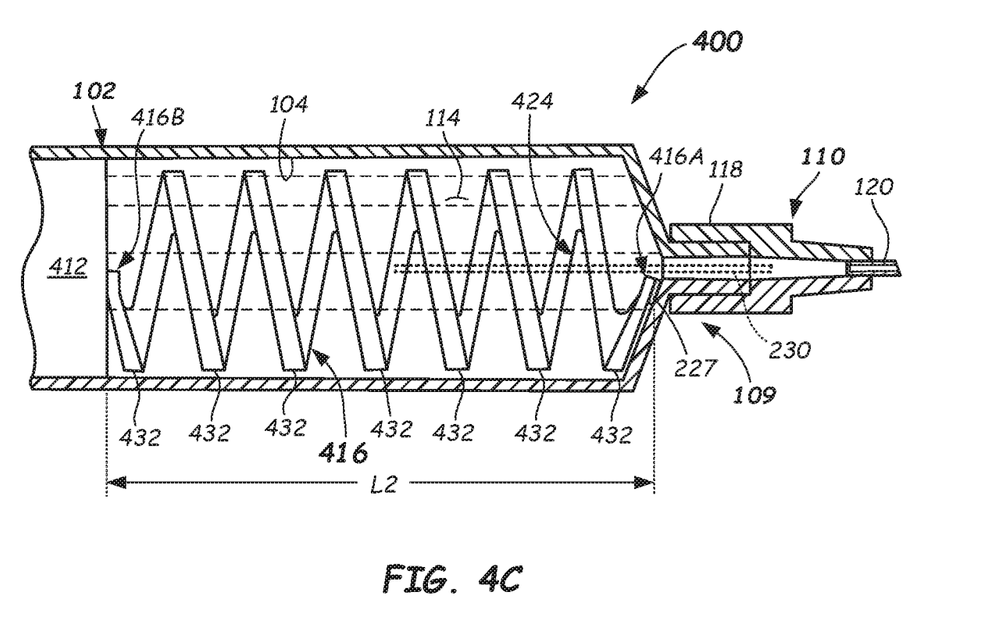
FIG. 4C illustrates a partial cross-sectional side view of a syringe apparatus including the embodiment of extensible additive-disassociating member of FIGS. 4A and 4B shown in an "extended" orientation according to one or more embodiments of the disclosure.

Another embodiment of an extensible additive-disassociating member 416 is shown in FIGS. 4A-4C. In this example, the extensible additive-disassociating member 416 comprises a molded spiral. The first end 416A is attached to the inlet end 109, such as by an adhesive 227, and a second end 416B is attached to the plunger head 412. In the embodiment shown, the second end 416B is integrally molded to the plunger head 112 and thus is formed at the same time as the plunger head. For example, both may be made of polypropylene.

Optionally, the extensible additive-disassociating member 416 can comprise a molded member, such as a molded spiral that can be adhered to the plunger head 412 in the same manner as the embodiments shown in FIGS. 2A and 3A. When the plunger head 412 is retracted from the "closed" orientation (e.g., like in FIG. 1A), the additive-disassociating member 416 takes on an extended profile as shown in FIG. 4C, wherein individual ones of the coils 432 are stretched so that the individual ones of the coils 432 are spaced along the extended length L2 of the reservoir 114.

Furthermore, as in the previous embodiments, the extensible additive-disassociating member 416 can include a central opening 424 therein. The central opening 424 allows, after removal of the needle assembly 110, the center of the reservoir 114 to be accessed by a probe 230 (shown dotted—only a portion shown) of a test apparatus (not shown) or sequence to enable extraction of a portion of the bio-liquid 115 from the reservoir 114 and analysis thereof.

Other forms of the extensible additive-disassociating member 416 may be used, such as folded origami sheets of various configurations, collapsing columns, lattices, and the like. The various portions of the extensible additive-disassociating members 116, 216, 316, 416 along the length thereof can be formed to include holes, appendages, projections, or other flow-diverting or mixing structures to aid in mixing the bio-liquid and/or the additive with the bio-liquid.

In some additional embodiments, the extensible member 116, etc. may be devoid of an additive and thus may operate simply as a mixing member within the reservoir. For example, the extensible member 116, etc. can be used to re-suspend red blood cells after a period of settling, or otherwise aid in mixing in an additive that may be disposed elsewhere in the reservoir 114, etc., such as when provided on the inner walls thereof.

In this embodiment, the physical structure can be the same or similar as any of the embodiments described in FIGS. 1A-1C, 2A-2C, 3A-3C, and 4A-4C, but is simply devoid of an additive in, or on, the extensible member 116, etc.

In this embodiment, a syringe apparatus 100, etc. is provided comprising a barrel 102 including an inner surface 104, an open end 108, and an inlet end 109, a plunger 106 including a plunger head 112, 412, received in slidable sealing contact with the inner surface 104 of the barrel 102 and forming a reservoir 114 therein, and an extensible member 116, 216, 316, 416 contained in the reservoir 114.

The extensible member 116, 216, 316, 416 can be coupled to the inlet end 109 and the plunger head 112, 412. In operation, the extensible member 116, 216, 316, 416 is extensible (capable of extending) upon drawing a bio-liquid 115 into the reservoir 114. Moreover, the extensible member 116, 216, 316, 416, which can include any of the configurations described herein, can aid in mixing the bio-liquid 115 even after drawing in the bio-liquid 115 by performing manipulations of the barrel 102, such as light shaking, rotation, or other agitating or mixing manipulations thereof.

Figure 5:
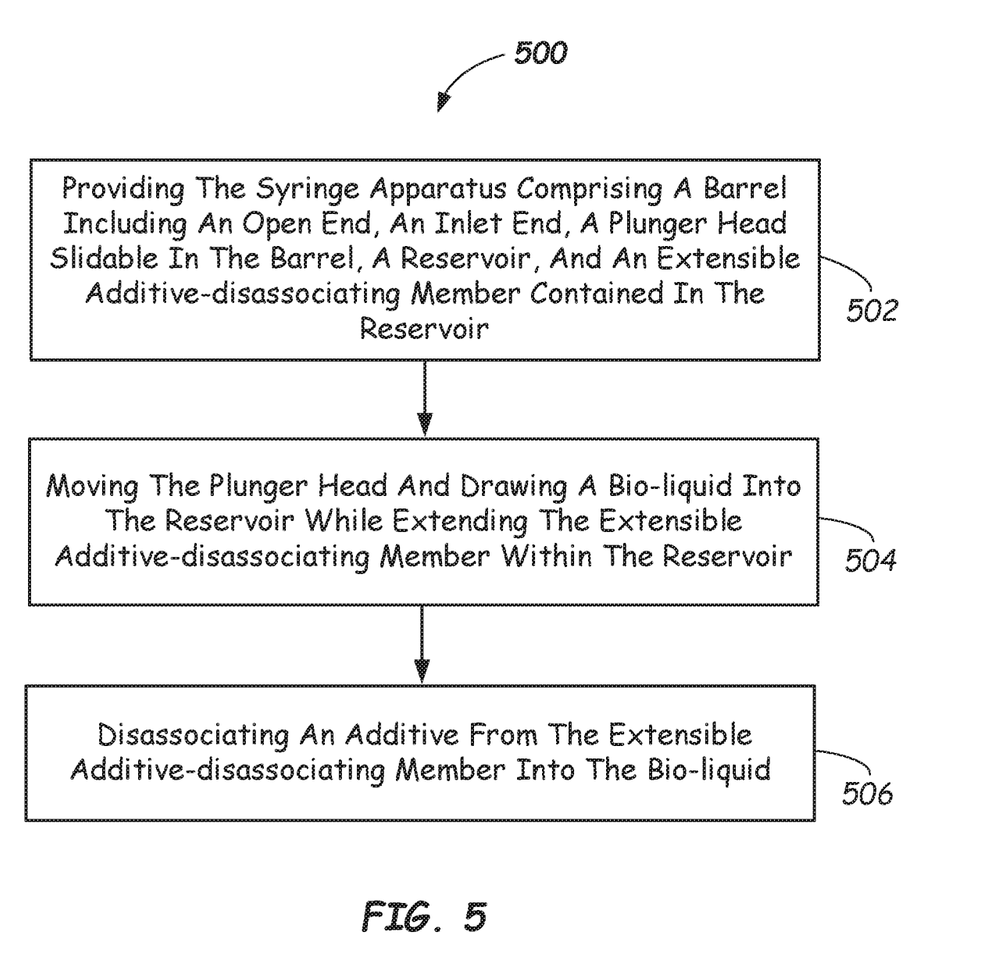
FIG. 5 illustrates a flowchart of a method of adding an additive to a bio-liquid in a syringe apparatus according to embodiments of the disclosure.

According to another aspect, a method of adding an additive to a bio-liquid according to one or more embodiments will now be described with reference to FIG. 5. The method 500 includes, in 502, providing the syringe apparatus (e.g., syringe apparatus 100, 200, 300, 400, and the like) comprising a barrel (e.g., a cylindrical barrel 102) including an open end 108 (e.g., open end 108), and an inlet end 109 (e.g., partially closed inlet end 109), a plunger head (e.g., plunger head 112, 412) that is slidable in the barrel (e.g., barrel 102), a reservoir (e.g., reservoir 114), and an extensible additive-disassociating member (e.g., extensible additive-disassociating member 116, 216, 316, 416, and the like) contained in the reservoir (e.g., reservoir 114).

The method 500 further includes, in 504, moving the plunger head (e.g., plunger head 112, 412) and drawing a bio-liquid (e.g., bio-liquid 115) into the reservoir (e.g., reservoir 114) while extending the extensible additive-disassociating member (e.g., extensible additive-disassociating member 116, 216, 316, 416, and the like) within the reservoir (e.g., reservoir 114).

The method 500 further includes, in 506, disassociating an additive (e.g., additive 225) from the extensible additive-disassociating member (e.g., extensible additive-disassociating member 116, 216, 316, 416, and the like) into the bio-liquid (e.g., bio-liquid 115). The configuration of the extensible additive-disassociating member (e.g., extensible additive-disassociating member 116, 216, 316, 416, and the like) is such that disassociation of the additive 225 from the body (e.g., 116P, 216P, 216P') and mixing with the bio-liquid 115 can occur. A large surface area is available and is exposed to the bio-liquid (e.g., bio-liquid 115) along the extended length L2 enabling the additive to be disassociated throughout the volume of the bio-liquid (e.g., bio-liquid 115). Less manipulation of the syringe apparatus 100-400 to obtain disassociation and mixing of the additive 225 could be used as compared to conventional methods.

ILLUSTRATIVE EMBODIMENTS

According to another aspect of the present disclosure, a method of adding an additive to a bio-liquid is provided. The method comprises providing a syringe apparatus comprising a barrel including an open end, and an inlet end, a plunger head slidable in the barrel, a reservoir, and an extensible member, optionally including an additive, contained in the reservoir; moving the plunger head and drawing the bio-liquid into the reservoir while extending the extensible additive-disassociating member within the reservoir. The method can include disassociating an additive from the extensible additive-disassociating member into the bio-liquid in the reservoir.

According to a further aspect of the present disclosure, a method of mixing a bio-liquid is provided. The method comprises providing a syringe apparatus comprising a barrel including an open end, an inlet end, a plunger head slidable in the barrel, a reservoir, and an extensible member within the reservoir, optionally including an additive contained in the reservoir, and moving the plunger head and drawing the bio-liquid into the reservoir while extending the extensible member within the reservoir wherein mixing of the bio-liquid is enhanced by the presence of the extensible member. The method can further enhance mixing even after drawing in the bio-liquid by enhancing a mixing effect when manipulating the body. Thus, the extensible member in the reservoir can be used to further mix the bio-liquid or to mix in an additive provided elsewhere in the reservoir, but not initially on the extensible member.

While some embodiments of this disclosure have been disclosed in example forms, many modifications, additions, and deletions can be made therein without departing from the scope of this disclosure, as set forth in the claims and their equivalents.

What is claimed is:

1. A syringe apparatus, comprising:
   a barrel including an inner surface, an open end, and an inlet end;
   a plunger including a plunger head received in slidable sealing contact with the inner surface of the barrel and forming a reservoir therein; and
   an extensible additive-disassociating member contained within the reservoir, the extensible additive-disassociating member extensible along its length within the reservoir to facilitate mixing a bio-liquid specimen drawn into the reservoir, the extensible additive-disassociating member comprising a central opening formed therein configured for insertion therethrough of a probe into the reservoir.

2. The syringe apparatus of claim 1, wherein the extensible additive-disassociating member is coupled between the plunger head and the inlet end.

3. The syringe apparatus of claim 2, wherein a first end of the extensible additive-disassociating member is attached to the plunger head.

4. The syringe apparatus of claim 2, wherein a second end of the extensible additive-disassociating member is attached to the inlet end.

5. The syringe apparatus of claim 1, wherein the extensible additive-disassociating member comprises an additive configured to retain or change a state or property of a bio-liquid specimen drawn into the reservoir.

6. The syringe apparatus of claim 5, wherein the extensible additive-disassociating member comprises an additive coated on a surface thereof.

7. The syringe apparatus of claim 5, wherein the extensible additive-disassociating member comprises an additive absorbed into an absorbent matrix thereof.

8. The syringe apparatus of claim 5, wherein the additive is selected from a group of anticoagulants consisting of a heparin-containing compound, citrate-phosphate-dextrose (CPD), citrate phosphate adenine (CPDA-1), a glycolytic inhibitor, sodium fluoride, potassium oxide, lithium oxalate ($Li_2C_2O_4$), sodium polyanetholesulfonate, disodium salt dihydrate (Na2EDTA), dipotassium ethylenediaminetetraacetic acid (K2EDTA), tripotassium ethylenediaminetetraacetic acid (K3EDTA), potassium ethylenediaminetetraacetic acid (KEDTA), sodium fluoride and potassium oxalate, and sodium fluoride and sodium oxalate, and combinations thereof.

9. The syringe apparatus of claim 1, wherein the extensible additive-disassociating member comprises a flexible plastic sheet, a fibrous material, paper, a porous membrane, or a porous film.

10. The syringe apparatus of claim 1, wherein the extensible additive-disassociating member comprises an additive that comprises a coagulant.

11. The syringe apparatus of claim 1, wherein the extensible additive-disassociating member comprises an additive that comprises a marker.

12. The syringe apparatus of claim 1, wherein the extensible additive-disassociating member comprises a first end and a second end and one or both ends further comprise an adhesive applied thereto.

13. The syringe apparatus of claim 1, wherein the extensible additive-disassociating member comprises a spiral, wherein a first end is attached to the inlet end and a second end is attached to the plunger head.

14. The syringe apparatus of claim 1, wherein the central opening is aligned with a longitudinal center of the reservoir.

15. The syringe apparatus of claim 1, wherein the extensible additive-disassociating member comprises a plurality of interconnected elements.

16. The syringe apparatus of claim 1, wherein the extensible additive-disassociating member comprises a molded plastic member.

17. The syringe apparatus of claim 1, wherein the extensible additive-disassociating member comprises a molded plastic member integrally molded with the plunger head.

18. The syringe apparatus of claim 1, wherein the extensible additive-disassociating member comprises a coil.

19. The syringe apparatus of claim 1, wherein the extensible additive-disassociating member comprises a molded coil.

20. The syringe apparatus of claim 1, wherein the extensible additive-disassociating member is configured to be extendible in length as the plunger is moved to draw a bio-liquid into the reservoir.

21. The syringe apparatus of claim 1, further comprising a hub and needle assembly coupled to the inlet end.

22. A syringe apparatus, comprising:
a barrel including a cylindrical inner surface, an open end, and an inlet end;
a plunger including a plunger shaft and a plunger head, the plunger head received in slidable sealing contact with the cylindrical inner surface and forming a reservoir therein between the plunger head and the inlet end; and
an extensible additive-disassociating member contained in the reservoir and coupled to the plunger head and the inlet end, the extensible additive-disassociating member comprising a spiral having a helical path from a small diameter dimension to successively larger diameter dimensions and comprising a central opening formed therein configured for insertion therethrough of a probe into the reservoir, the extensible additive-disassociating member comprising at least one of an anticoagulant, a coagulant, or a marker.

23. A syringe apparatus, comprising:
a barrel including an inner surface, an open end, and an inlet end;
a plunger including a plunger head received in slidable sealing contact with the inner surface of the barrel and forming a reservoir therein; and
an extensible member contained in the reservoir, wherein the extensible member is configured to be extensible upon drawing a bio-liquid into the reservoir, the extensible member comprising a plurality of interconnected disc elements.

* * * * *